United States Patent
Zadro

Patent Number: 5,900,996
Date of Patent: May 4, 1999

[54] VARIABLE MAGNIFICATION MIRROR

[76] Inventor: Zlatko Zadro, 16742 Wanderer La., Huntington Beach, Calif. 92649

[21] Appl. No.: 08/708,290

[22] Filed: Sep. 4, 1996

[51] Int. Cl.⁶ ........................................................ G02B 5/08
[52] U.S. Cl. ........................................... 359/846; 359/838
[58] Field of Search .................................... 359/846, 847, 359/848, 849, 838

[56] References Cited

U.S. PATENT DOCUMENTS

| | | | |
|---|---|---|---|
| 3,628,852 | 12/1971 | Snaper et al. | 359/849 |
| 4,119,366 | 10/1978 | Lemaitre | 359/847 |
| 5,291,337 | 3/1994 | Greger et al. | 359/846 |
| 5,557,477 | 9/1996 | Sawicki | 359/847 |
| 5,677,800 | 10/1997 | Soll et al. | 359/847 |

FOREIGN PATENT DOCUMENTS

| | | | |
|---|---|---|---|
| 283136 | 11/1934 | Italy | 359/846 |
| A 64-42603 | 2/1989 | Japan | 359/846 |
| 400445 | 10/1933 | United Kingdom | 359/846 |

*Primary Examiner*—Cassandra C. Spyrou
*Assistant Examiner*—John Juba, Jr.
*Attorney, Agent, or Firm*—William L. Chapin

[57] ABSTRACT

A variable magnification mirror having a thin diaphragm provided with a reflective front surface includes a mechanism for deforming the diaphragm from a flat shape, yielding unity magnification of images formed by the reflective surface, to adjustably greater curvatures yielding adjustably larger magnification factors. The mechanism includes a screw-driven, flexible circular puller plate fastened to a rear central portion of the rear surface of the reflective diaphragm, the outer peripheral edge of the diaphragm being held axially fixed with respect to the screw. In the preferred embodiment, the puller plate is so constructed as to have greater flexibility at outer radial portions thereof to accommodate larger angular defections of the outer radial portions of the diaphragm, thereby aiding in maintenance of substantially spherical, distortion free contour. The increased flexibility of outer radial portions of the puller plate is preferably effected by a radial taper provided in the puller plate cross section, the outer radial portions of the plate being progressively thinner than the central radial portion of the puller plate. Preferably, the puller plate is fastened to the rear surface of the reflective diaphragm by means of a resilient adhesive member, the elastic deformability of the member further aiding in maintenance of a substantially spherical diaphragm contour.

14 Claims, 7 Drawing Sheets

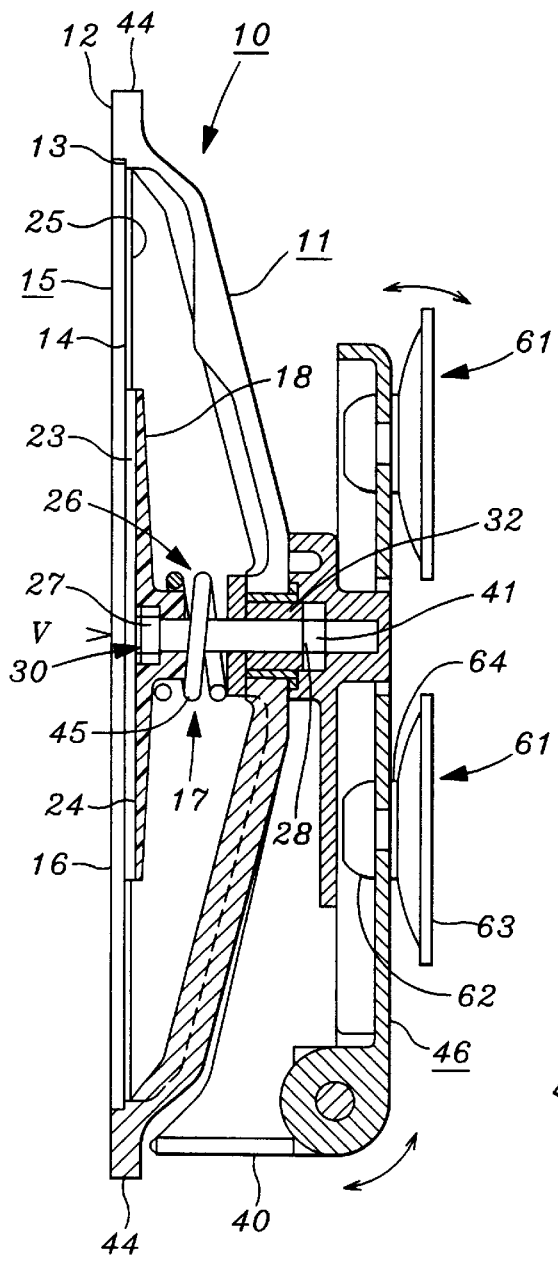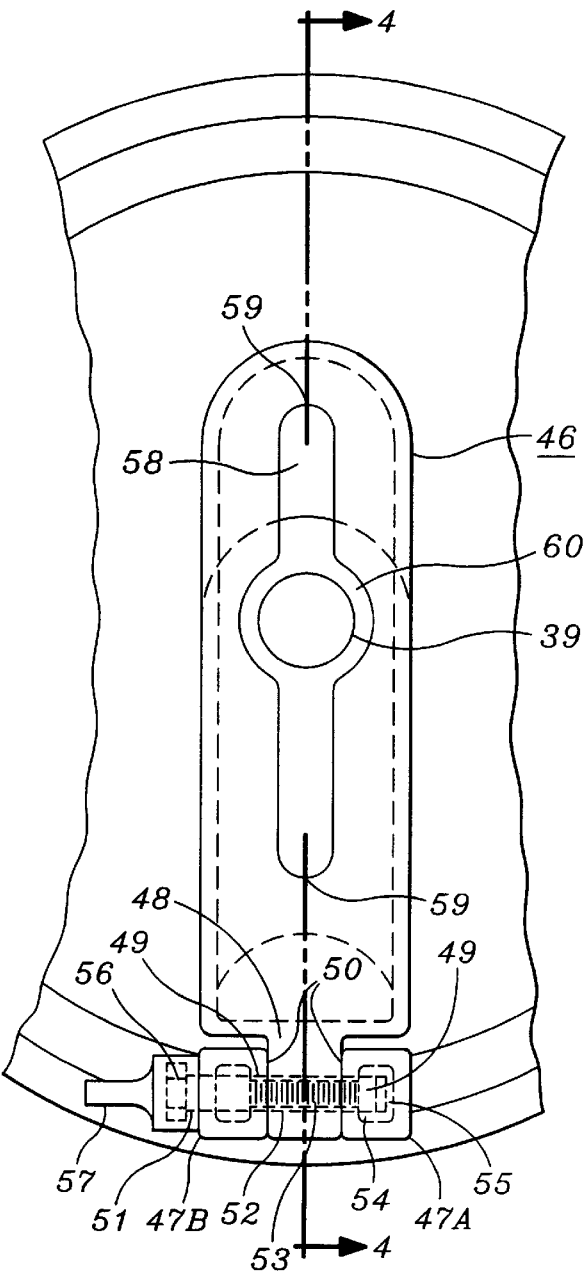
Fig. 4A
Fig. 2

VARIABLE MAGNIFICATION MIRROR

BACKGROUND OF THE INVENTION

A. Field of the Invention

The present invention relates to mirrors of the type generally used by people for personal hygiene purposes such as shaving, application of cosmetics and the like. More particularly, the invention relates to a mirror having a magnification that may be readily varied by the user.

B. Description of Background Art

There are a variety of circumstances in which it would be desirable to have available a face mirror that has a variable magnification. For example, when a person who may be somewhat near-sighted wishes to install or remove contact lenses ordinary flat bathroom mirrors or portable mirrors having a one-to-one, or unity, magnification factor, are often inadequate to facilitate this task. In such cases, it would be desirable to have a magnifying mirror available for use in place of or in addition to a flat mirror with unity magnification. However, since the field of view of a magnifying mirror of a given size is inherently smaller than that of a flat, unity magnification mirror the applications for a mirror having a fixed magnification are somewhat limited. Thus, a person installing or removing contact lenses may desire to use a mirror having a reasonably large magnification, but may at other times wish to have a full face view provided by a mirror having a smaller magnification, or a conventional flat mirror having no magnification. Also, applying cosmetics, shaving, and performing other such tasks related to personal hygiene or beauty would oftentimes be facilitated by the availability of a mirror having a selectable or variable magnification.

One approach to satisfying the need for a personal hygiene mirror having different magnifications consists of a two-sided mirror, which has on one side a flat, unity magnification factor mirror, and on the other side a concave mirror having a magnification factor greater than unity, the two mirrors being assembled in a back-to-back configuration. However, the weight increase resulting from double mirrors, and the lack of variability of the magnification factor of the magnifying mirror to a precise desired value, limits the usefulness of dual magnification mirrors. Accordingly, it would be desirable to provide a variable magnification mirror suitable for personal hygiene and cosmetic applications.

A variety of prior art variable magnification mirrors have been disclosed. Prior art references disclosing such mirrors include the following U.S. Pat. Nos. 3,514,776, Mulready; 3,610,738, Bochman; 4,298,247, Michelet et al.; 4,420,222, Bret et al.; 4,422,733, Williams, Jr. et al.; 4,875,764. Marino et al.; 5,016,998, Bulley et al.; 5,074,654, Alden et al.; 5,089,915, Gobeli. Foreign references disclosing variable magnification mirrors include: Japanese Patent No. 64-42603; United Kingdom Patent No. 400,445; and Italian Patent No. 0,283,136.

Although the devices disclosed in the aforementioned prior art references may be more or less useful for their intended purposes, the devices disclosed, whether considered either separately or collectively, have characteristics which limit their usefulness for personal hygiene applications. For example, the Mulready mirror device requires the use of a mirror plate having a precisely contoured rear surface, and a vacuum chamber and control system, on the one hand, or a complex arrangement of multiple bosses and screws to bend the mirror and thereby vary its magnification.

The adjustable magnifying mirror disclosed in Bochman also utilizes a vacuum chamber to bend a mirror plate, with the inherent problems of precision adjustability and sealing against vacuum leaks.

The adjustable reflector disclosed in Williams, Jr. et al. Also requires the use of a vacuum system and associated controls.

The adjustable mirror disclosed in Wurzburger requires the use of a pre-curved mirror plate, in conjunction with various pusher plates.

In view of perceived limitations of prior art variable mirrors, the present invention was conceived of.

OBJECTS OF THE INVENTION

An object of the present invention is to provide a mirror having a magnification that may be continuously and readily varied over a substantial range of magnifications.

Another object of the invention is to provide a mirror in which the magnification may be varied by hand over a substantial range of magnifications.

Another object of the invention is to provide a portable mirror that has a magnification which may be varied from unity to two to four times or more, by manually turning a portion of the mirror support structure.

Another object of the invention is to provide a variable magnification mirror having a simplified design that facilitates its economical manufacture.

Another object of the invention is to provide a portable variable magnification mirror incorporating means for continuously and easily varying the mirror magnifications over a substantial range, while maintaining a substantially distortion-free image.

Another object of the invention is to provide a variable magnification mirror having a flexible reflective diaphragm that is bendable to a range of substantially spherical concave shapes by means of a pulling actuator, the spherical shape ensuring distortion-free imaging over the magnification range.

Another object of the invention is to provide a substantially distortion-free variable radius-of-curvature concave mirror having an imperforate flexible mirror plate, and a puller plate adhered to the back side of the mirror plate.

Another object of the invention is to provide a variable magnification mirror having a flat flexible reflecting diaphragm which is deformable into a substantial range of spherical shapes by means of a circular puller plate having a radially tapered cross section, adhered by a resilient adhesive layer to the back surface of the diaphragm, the combined effect of the resilient adhesive layer and tapered puller plate resulting in the maintenance of a substantially spherical mirror contour over a substantial range of magnification.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention contemplates a mirror device having a magnification factor which may be varied from unity to a substantially larger value, 5×, for example, by axially deforming a flexible mirror plate or diaphragm of the mirror device, thereby decreasing its radius of curvature and focal length.

A basic embodiment of a variable magnification mirror according to the present invention includes a flexible reflective mirror plate or diaphragm having a front reflective mirror surface, and means for pulling rearward a central portion of the mirror plate, thereby deforming the mirror plate into a concave shape and causing the magnification of the mirror to increase from a value of unity, for the flat, undeformed mirror, to a value greater than unity. In the preferred embodiment, the pulling means comprises a screw actuated flexible circular puller plate attached coaxially to the rear surface of the mirror plate. Preferably, the puller plate has a radially tapered cross section, whereby outer circumferential portions of the puller plate are progressively thinner and, therefore, more flexible. The front surface of the circular puller plate is fastened to the rear surface of the flexible mirror plate, preferably by means of a resilient adhesive layer. The puller plate may be pulled rearward by means of a screw fastened to the center of the puller plate and threadably engaged by a threadable bore in a mirror support member held in fixed relationship to the peripheral edge of the mirror. The increased flexibility of the outer circumferential portion of the tapered puller plate, combined with a capability for the thickness of the adhesive layer bonding the puller plate to the mirror plate to vary resiliently, allows the mirror plate to be deformed sufficiently to cause a substantial increase in magnification, while maintaining a substantially spherical concave shape, resulting in minimal image distortion.

BRIEF DESCRIPTION OF THE DRAWINGS

FIG. 2 is a fragmentary rear view of the mirror of FIG. 1.

DETAILED DESCRIPTION OF THE PREFERRED EMBODIMENTS

Referring now to FIGS. 1–6, a variable magnification mirror with elastically deformable puller plate according to the present invention is shown.

Figure 1A:
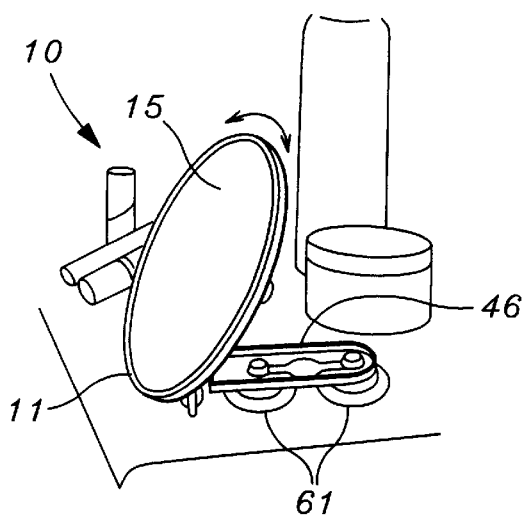
FIG. 1A is a front perspective view of a variable magnification mirror according to the present invention, showing the mirror mounted on a table top.
Figure 1B:
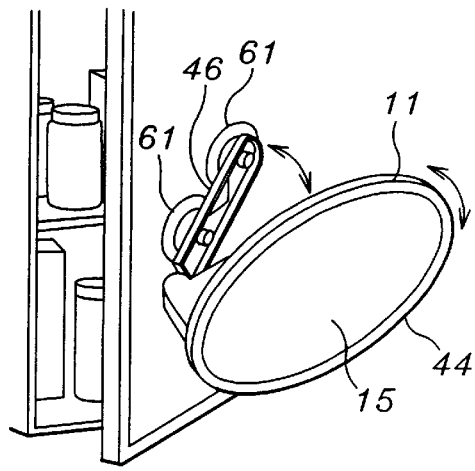
FIG. 1B is a front perspective view of the mirror of FIG. 1, showing the mirror attached to a medicine cabinet.
Figure 1C:
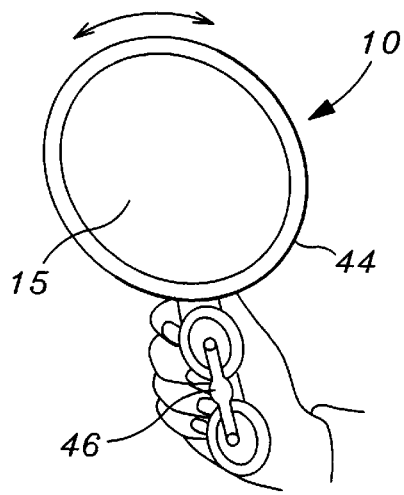
FIG. 1C is another perspective view of the mirror of FIG. 1, showing the mirror held in a person's hand.
Figure 3:
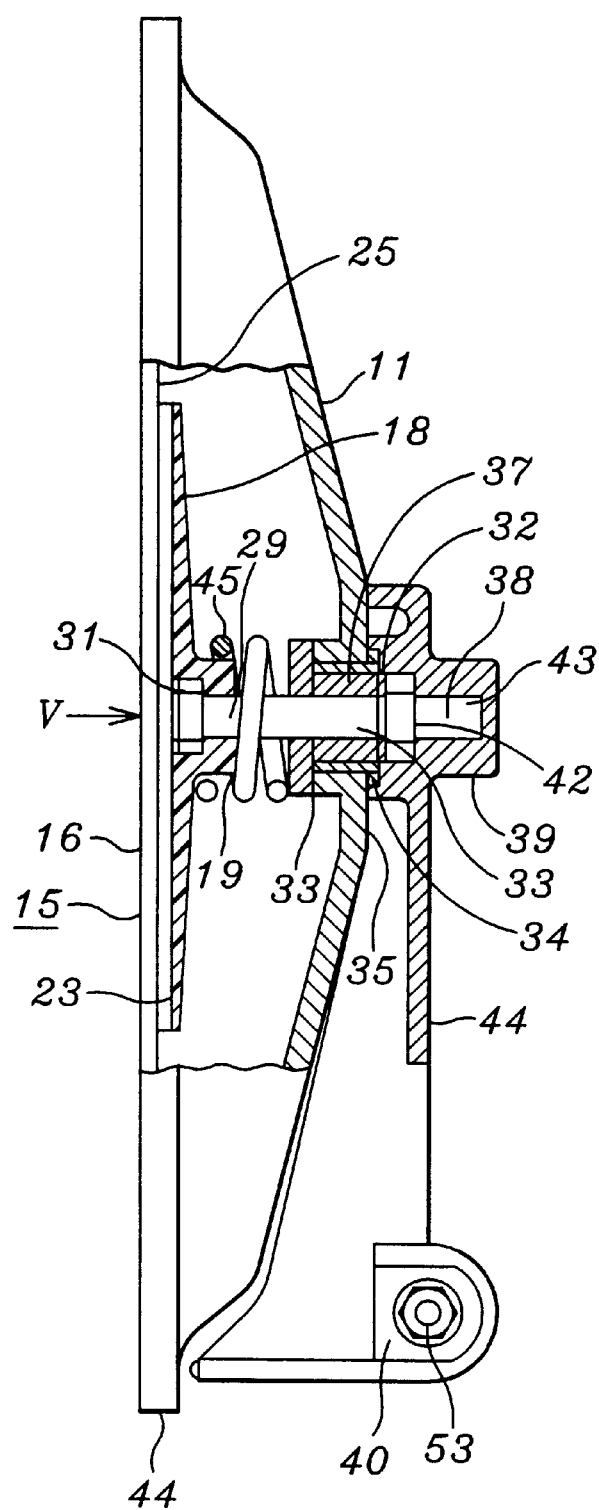
FIG. 3 is a transverse sectional view of the mirror of FIG. 1, showing certain components thereof deleted for clarity.

As shown in FIGS. 1–3 variable magnification mirror 10 includes a rearwardly convex circular frame 11 having a flat, front radially outwardly projecting annular flange 12 provided with an axially inwardly recessed annular shoulder flange 13 on which is seated a circular mirror plate assembly 14.

Figure 4B:
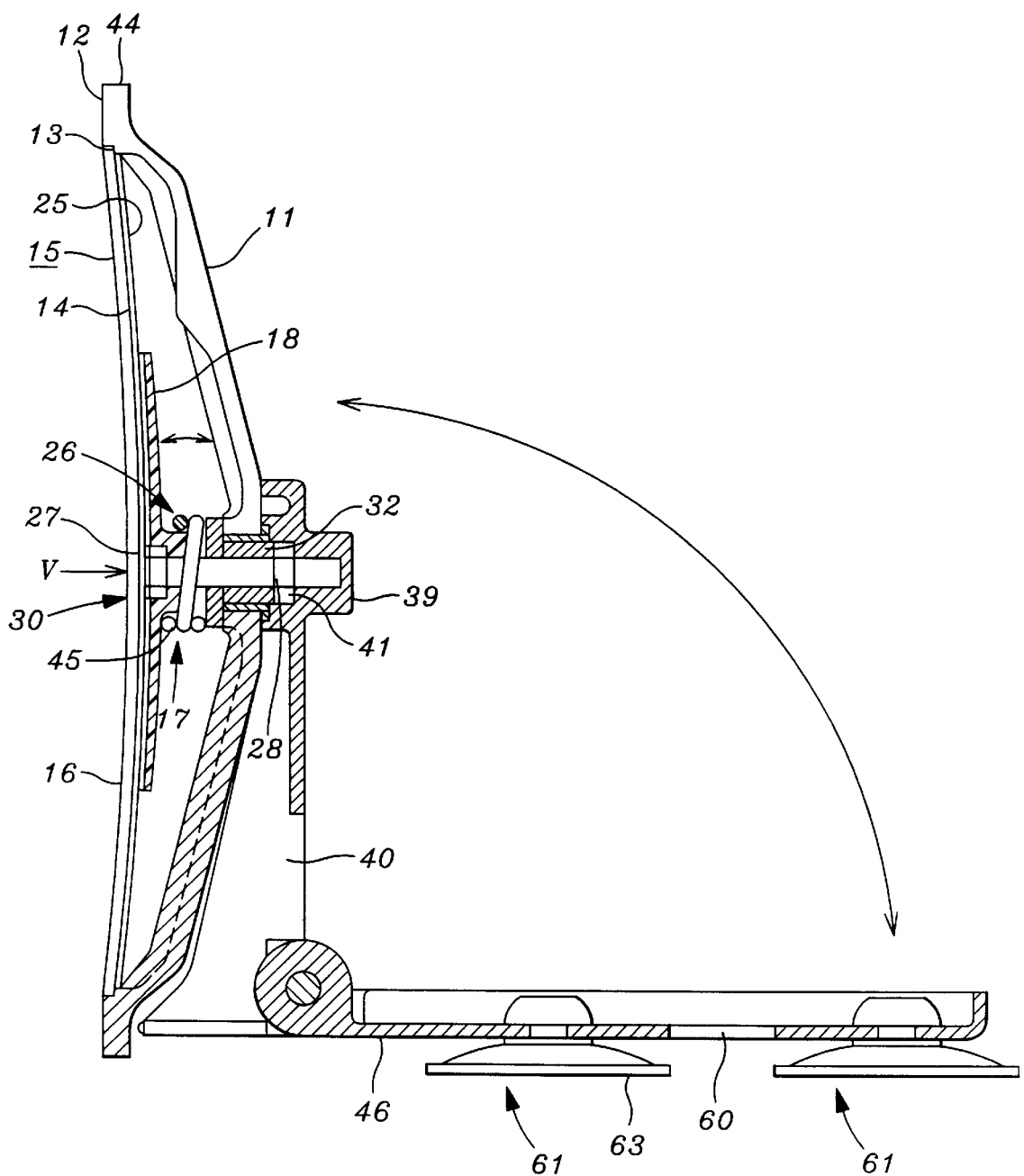
FIG. 4 is a transverse sectional view similar to that of FIG. 2, but showing the handle support thereof folded into contact with the frame for transport.
FIG. 4A is a transverse sectional view of a puller plate comprising part of article shown in FIG. 4.
Figure 4C:
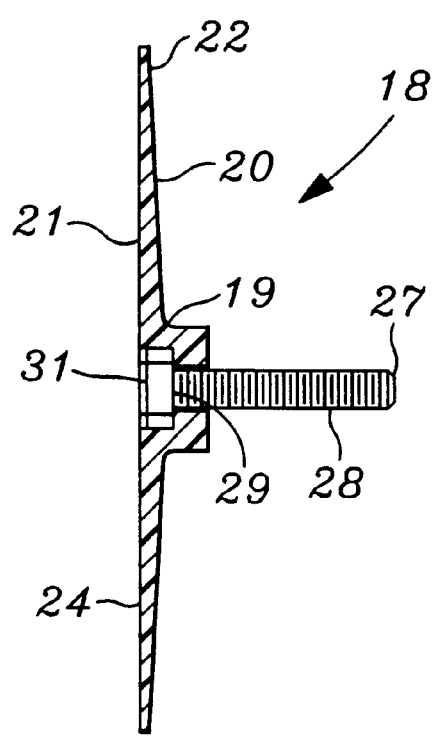
Figure 4D:
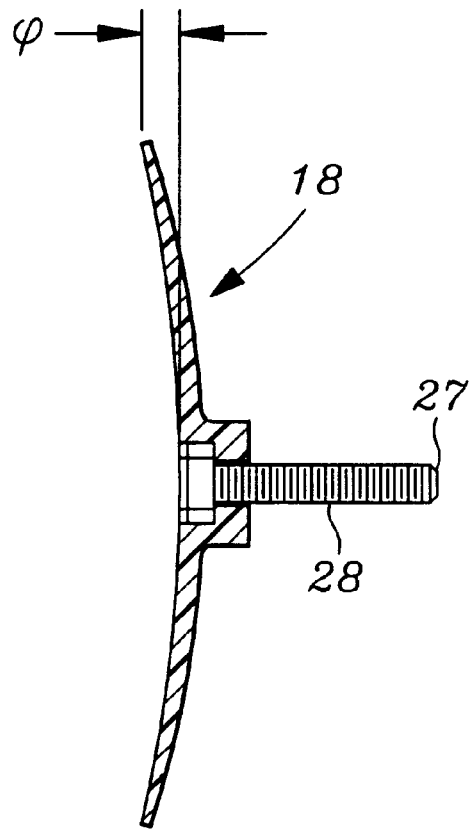

As may be seen best by referring to FIGS. 3 and 4, mirror plate assembly 14 includes a thin, circular mirror plate or diaphragm 15 having a generally uniform thickness. Mirror plate 15 is preferably made of a strong, flexible material, such as polycarbonate or acrylic plastic, but may alternatively be made of other materials, such as thin metal sheets. Mirror plate 15 has a flat, highly reflective front surface 16, which may, for example, be formed by vacuum evaporation of metal onto the front of plate 15. Mirror 10 includes novel and effective means for deforming mirror plate 15 into a rearwardly convex shape, thereby deforming front surface 16 of mirror plate 15 into a concave shape which produces magnified images of objects in front of the mirror. These means will now be described.

As shown in FIGS. 3 and 4, mirror plate assembly 14 includes a puller assembly 17 which includes a circular puller plate 18. Puller plate 18 is made of thin, strong flexible material such as nylon or polycarbonate plastic, has a flat front surface, and a central relatively thick, rearwardly protruding cylindrical boss section 19. As shown in FIG. 4A, puller plate 18 also has a relatively large annular plate-shaped section 20 which radiates outwardly from boss section 19. Annular plate section 20 has a relatively thicker root section 21 joining boss section 19, and tapers to a relatively thin outer radial edge portion 22. A preferred taper angle for the transverse section of annular plate section 19 of puller plate 18 is about 2.5 degrees ±1 degree. Thus, in a representative embodiment of the invention tested by the present inventor which had a 5¾" diameter mirror plate 15, the outer diameter (O.D.) of puller plate was 3½ inches, the O.D. of central boss section 19 was 0.55 inch, the maximum central thickness of central boss section 19 was 0.29 inch, the thickness of the outermost portion 22 of plate section 20 was 0.035 inch, and the thickness of the innermost, root portion 21 of plate section 20 was 0.091 inch. Preferably, for mirrors of other sizes, puller plate 18 has a diameter of at least half as large as the diameter of mirror plate 15.

Referring still to FIGS. 3 and 4, puller assembly 17 may be seen to include a resilient adhesive member 23 joining the flat front surface 24 of puller plate 18 to the rear surface 25 of mirror plate 18. In a representative embodiment of a variable magnification mirror 10, adhesive member 23 consisted of a 1/16 inch thick, three-inch diameter circular disk made of an elastomeric polyurethane foam coated on both sides with acrylic adhesive. For larger mirrors, adhesive member 23 could be thicker, ⅛ inch thick, for example.

When central boss section 19 of puller assembly 17 is pulled rearward, the greater flexibility of the outer radial portions 22 of puller plate 18, resulting from the reduced thickness of those portions, in conjunction with the stretchability of adhesive member 23, causes the contour of front reflecting surface 16 of mirror plate 15 to assume a substantially spherical concave shape. The structural characteristics of variable magnification mirror 10 that provide means for reversibly exerting deforming forces on mirror plate 15 will now be described.

Figure 6:
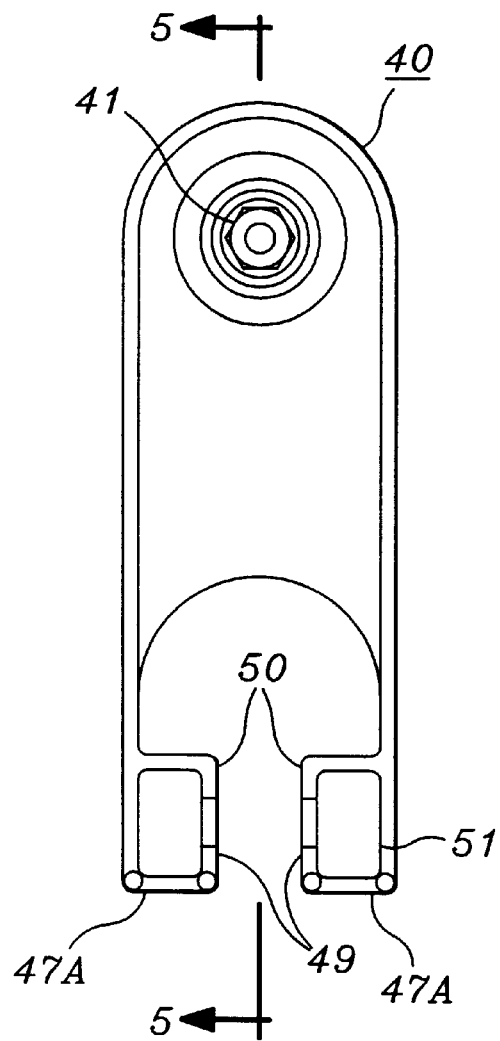
FIG. 6 is a front elevation view of the handle support of FIG. 5.
Figure 5:
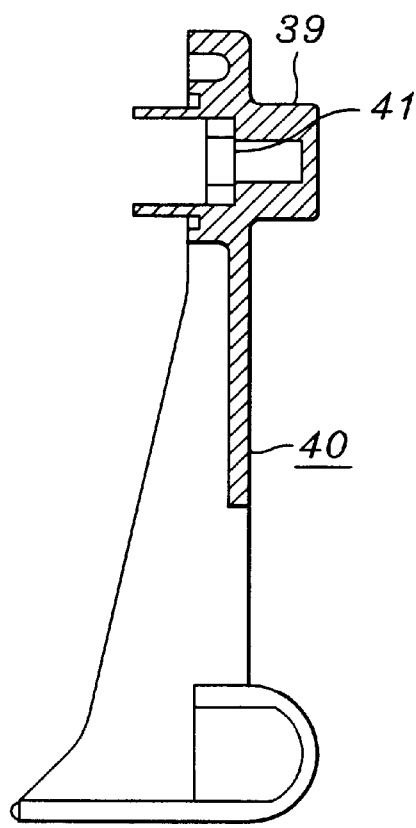
FIG. 5 is a transverse sectional view of the frame portion of the mirror of FIG. 1.

Referring now to FIGS. 5 and 6 in addition to FIGS. 3 and 4, variable magnification mirror 10 may be seen to include axial force actuator means 26 incorporated into frame 11, which functions in cooperation with structural elements connected with puller plate assembly 17, to exert manually adjustable axially directed forces on mirror plate 15.

Referring now to FIGS. 3 and 4, axial force actuator means 26 for exerting manually adjustable axial forces on puller plate assembly 17 may be seen to include a puller screw 27 having an externally threaded shank 28 that protrudes rearward out from a central coaxial bore 29 provided through central boss section 19 of puller plate assembly 17. Screw 27 has a polygonal head 30 that seats irrotationally in a complementarily-shaped counter bore 31 which extends rearward from front surface 24 of puller plate 18 and communicates with bore 29 through the puller plate.

As shown in FIGS. 3 and 4, threaded shank 28 of puller screw 27 protrudes through the central coaxial bore 33 of a flanged plug bushing 32 which is insertably received in a central coaxial bore 34 provided through rear wall 35 of frame 11. Bushing 32 has an enlarged diameter front annular flange section 36, and a rear cylindrical section 37 of smaller diameter, which fits tightly in an interference fit within a bore 38 provided in the upper web portion 39 of a handle support 40. A hex jam nut 41 is fitted irrotationally within bore 38 of handle support web 39, seated on an annular shoulder flange 42 that defines the boundary between bore 38 and a smaller diameter clearance bore 43 provided to receive the outer end of threaded shank 28 of puller screw 27.

Axial force actuator means 26 cooperates with other structural elements of variable magnification mirror 50 to allow the magnification factor thereof to be varied smoothly and continuously over a relatively wide range, by simple hand manipulation, as will now be described.

Referring now to FIG. 1 as well as FIGS. 3 and 4, frame 11 of mirror 10 may be rotated with respect to handle support 40 by grasping the outer peripheral flange section 44 of the frame, while the handle support is maintained in a fixed position. When this rotation is clockwise, as viewed from the front of mirror 10, screw 27 is threadingly advanced rearward in jam nut 41. This action causes a rearwardly directed, axial tension force to be exerted on puller plate 18. The tension force causes puller plate 18 to move axially rearward, thereby causing front surface 24 of the puller plate to exert a rearwardly directed tensional force on resilient adhesive member 23, and on rear surface 25 of mirror plate 15.

Since the outer peripheral edge of mirror plate 15 is seated on recessed shoulder flange 13 of frame 11, rearwardly directed tensional forces exerted on the rear surface of the mirror plate cause the mirror plate to deform into a convex shape. Also, since mirror plate 15 is of uniform thickness, convex deformation of rear surface 25 of the mirror plate causes front surface 16 of the mirror plate to deform into a concave shape, from an initially flat shape. Concave deformation of mirror plate 15 causes the magnification of images reflected from the front surface of the mirror plate to increase from unity, with the mirror plate in a flat, undeformed shape, to a factor greater than unity, for the concavely curved plate.

In FIG. 4, the vertex of mirror plate 15, indicated by the letter V, is defined by the intersection of the optical axis, which for mirror 10 is coincident with the longitudinal axis of rotational symmetry of the mirror, with front reflective surface 16 of mirror plate 15. With vertex V transversely aligned with the outer peripheral edges of mirror plate 15 seated on shoulder flange 13, front reflective surface 16 of the mirror plate lies in a flat plane. In this configuration, the radius of curvature of mirror plate 15 is infinite, resulting in unity magnification. When vertex V is translated rearward, mirror plate 15 is deformed into a concave shape having a progressively smaller, finite radius of curvature. The focal length f of concave mirror plate 15 is one-half the radius of curvature, R, measured forward along the optic axis from vertex V. For an object located between the focal point and vertex V of concave mirror plate 15, a magnified upright, virtual image of the object is formed, the magnification being given by the relationship $M=S'/S$, where S is the distance between the object and vertex, and S' is the distance between the vertex and image. The image distance S' is calculable from the equation $1/S+1/S'=1/f$ as $S'=Sf/S-f$. For example, with R=240 mm, f=120 mm, and for an object distance S equal to 60 mm, the image distance S' is –120 mm, resulting in magnification M=2×. Increasing the concave curvature of mirror plate 15 by moving vertex V of the mirror plate rearward as a result of rotating frame 11 of the mirror clockwise, causes the radius of curvature and focal length of the mirror plate to decrease. For example, decreasing the focal length to 80 mm, while maintaining the same object distance, increases the magnification from 2× to 4×.

Referring again to FIGS. 3 and 4, it may be readily envisioned that axially rearwardly displacing the central section of mirror plate 15 along with central boss section 19 of mirror 10 causes outer radial portion 22 of the mirror plate to bend at progressively large angles, since the outer peripheral edge of the mirror plate is seated immovably on shoulder flange 13 of frame 11. Therefore, to permit mirror plate 15 to deform smoothly into a substantially spherical contour, if puller plate 18 were rigid, resilient adhesive member 23 would have to be substantially thick. Since thick resilient adhesive layers of the required diameter are relatively expensive, the present invention utilizes a tapered puller plate 18, relegating the bulk of the required radially differential displacement of rear surface 15 of mirror relative to its center to be accommodated by progressively larger deflection or bending of the outer portion of the puller plate. Thus, the mirror deflection structure according to the present invention achieves substantially spherical deformation of mirror plate 15, resulting in substantial distortion-free magnified images, at a minimum cost and complexity.

Although the embodiment of mirror 10 shown in FIGS. 1–6 has a circular plan view shape, that shape could optionally be oval, rectangular, square or polygonal.

As shown in FIGS. 3 and 4, mirror 10 includes restoring force means for exerting a forwardly directed axial force on mirror plate 15, when mirror frame 11 is rotated counter-clockwise to reduce the magnification of the mirror. Thus, as shown in FIGS. 3 and 4, a helical compression spring 45 is positioned coaxially over central boss section 19 of puller plate and bushing plug 32 in frame 11. Spring 45 is of the proper length to be compressed between frame 11 and puller plate 18, exerting an axially forwardly directed, undeforming or restoring force on mirror plate 15.

In the preferred embodiment, that portion of rear surface 25 of mirror plate 15 seated on shoulder flange 13 of mirror frame 11 is adhered thereto by an adhesive layer, to prevent the mirror plate from becoming unseated by excessive counter-clockwise rotation of the mirror frame. Alternatively, mirror plate 15 could be retained in position by means of an annular bezel ring fastened to the front of the frame.

Figure 7:
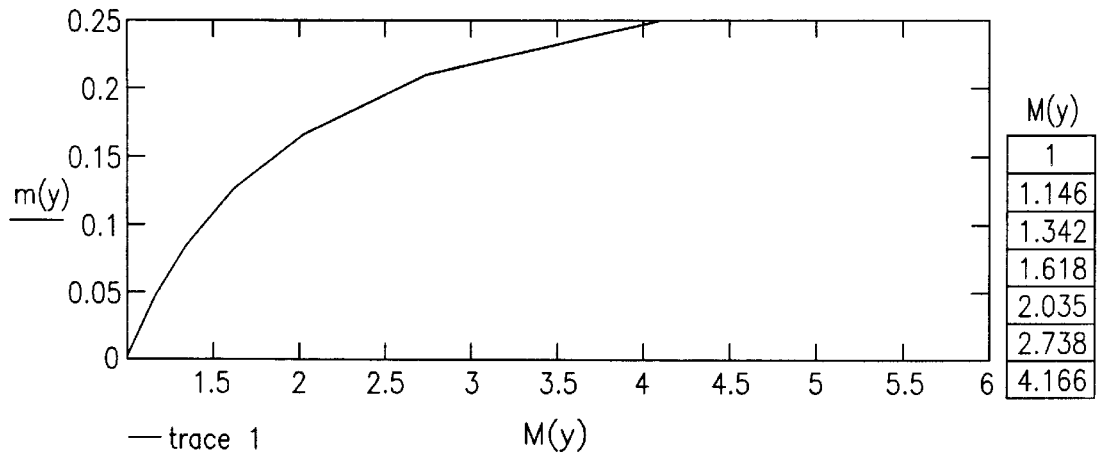
FIG. 7 is a graph showing the variation of the magnification factor of the mirror of FIGS. 1–6, as a function of deflection of the center of the mirror relative to the periphery thereof.
Figure 8:
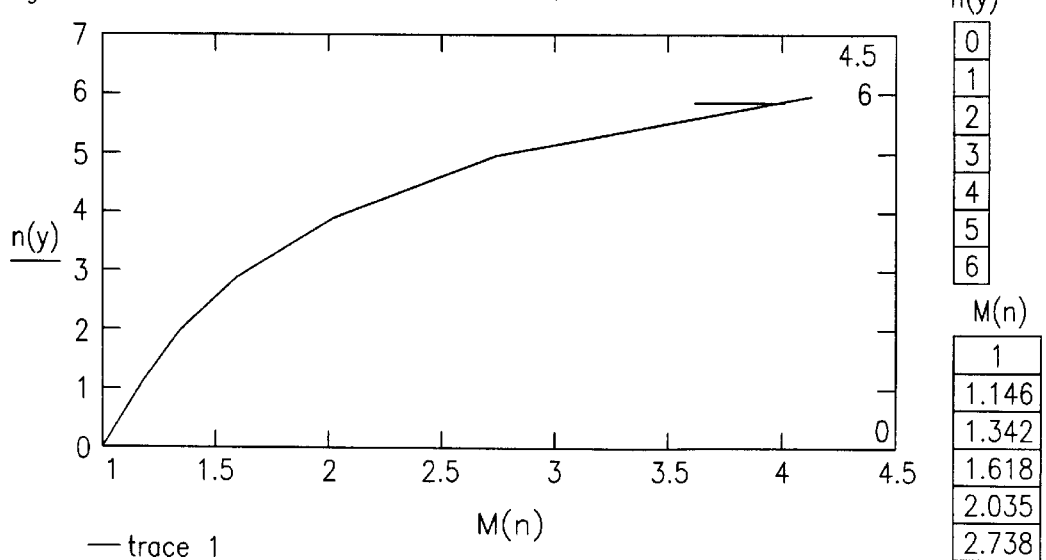
FIG. 8 is a graph showing the variation of the magnification factor of the mirror of FIGS. 1–6, as a function of the number of rotations of the mirror frame with respect to the handle support of the mirror.

FIG. 7 is a graph illustrating magnification factor versus axial rearward deflection of the center of mirror plate 15. FIG. 8 is a graph illustrating magnification versus turns of mirror frame 11 relative to handle support 40.

In FIG. 7, the magnification factor of mirror 10 is indicated by the horizontal (abscissa) scale, while the independent variable, rearward deflection in inches of the center of mirror plate 15 from the periphery of the mirror plate, is indicated by the vertical (ordinate) scale.

In FIG. 8, the magnification factor of mirror 10 is again indicated by the abscissa, while the ordinate indicates the number of turns of mirror frame 11 relative to handle support 40.

In the embodiment of variable magnification mirror 10 according to the present invention and shown in FIGS. 1–6 means are provided to fasten the mirror to horizontal or vertical surfaces, as well as to hold the mirror by hand, as will now be described.

Referring now to FIGS. 1–4, mirror 10 may be seen to include a bar-shaped handle 46 that is pivotably mounted to the lower end of handle support 40. As may be seen best by referring to FIGS. 2, 4 and 6, handle support 40 includes at the lower end thereof a pair of laterally spaced apart hollow boss sections 47A and 47B that receive therebetween a tang 48 that protrudes longitudinally outwards from one end of handle 46. Axially aligned bores 49 through the inner facing walls 50 of right and left boss sections 47A and 47B, bore 51 through the outer wall of left boss section 47B, and bore 52 through tang 48 receive a pivot screw 53. Pivot screw 53 is held in place with the bores by means of a hex jam nut 54 within the hollow interior space 55 of right boss section 47A, in combination with a hex knob nut 56 imbedded within a finger knob 57. With this arrangement, finger knob 57 and nut 56 may be loosened on pivot screw 53, allowing handle 46 to be pivoted to any desired position between the fully upward, folded storage or transport position, shown in FIG. 4, and the fully extended position, shown in FIG. 1C.

As may be seen best by referring to FIG. 4, handle 46 of mirror 50 is preferably provided with a pair of suction cups 61 which facilitate attaching the mirror to a counter or table top, or to a mirror, medicine cabinet or hotel window. Thus, as shown in FIGS. 2 and 4, handle 46 is provided with a longitudinally elongated, laterally symmetrically located rectangular slot perforation 58. Rectangular perforation 58 has radiused opposite longitudinal end walls 59, and has a central circular perforation enlargement 60 located midway between the end walls. Circular perforation enlargement 60 is provided to receive the head flanges 62 of a pair of suction cups 61 which are individually inserted into the circular perforation, and slid longitudinally outwards to seat against opposite radiused end walls 59 of slot perforation 58. Suction cups 61 each have a concave lower resilient cup portion 63 adapted to adhere to smooth surfaces, and an upper annular reduced diameter neck 64 that is joined at the upper end thereof to head flange 62 of the suction cup. Preferably, the axial length of neck 64 is slightly less than the thickness of handle 46, maintaining suction cups 61 in place in slot 58 in the handle by a resilient interference fit.

What is claimed is:

1. A mirror having a variable focal length and hence magnification factor, said mirror comprising;
   a. a flexible diaphragm having a reflective surface,
   b. means for deforming at least a portion of said reflective surface into a symmetric contour, said means comprising in combination,
      i. peripheral support means for supporting the outer peripheral edge portions of said diaphragm,
      ii. actuator means for axially displacing in a direction oblique to said reflective surface a central portion of said diaphragm relative to said peripheral edge portions thereof, said actuator means not penetrating said diaphragm and adapted to exert adjustable axially directed forces on said diaphragm, said axially directed forces exerted by said actuator means being confined to a central portion of said diaphragm and said axially directed forces including a tension component, and,
   c. restoring force means for applying a compressional force to said diaphragm, thereby urging said diaphragm to an undeformed rest position upon reduction of said axial tension force.

2. The mirror of claim 1 wherein said actuator means is further defined as including a puller plate having fastened to the front surface thereof by first fastening means a resilient member, said resilient member having a front surface fastened by second fastener means to the rear surface of said diaphragm.

3. The mirror of claim 2 wherein at least one of said first and second fastening means is further defined as including an adhesive layer.

4. The mirror of claim 2 wherein actuator means is further defined as comprising in combination an elongated threaded member fastened to the center of said puller plate and extending axially rearward therefrom, and a mirror support member held in fixed relationship to said peripheral support means for said diaphragm, said mirror support member being threadably engageable with said elongated threaded member.

5. A mirror having a variable focal length and hence magnification factor, said mirror comprising;
   a. a flexible diaphragm having a reflective surface,
   b. means for deforming at least a portion of said reflective surface into a symmetric contour, said means comprising in combination,
      i. peripheral support means for supporting the outer peripheral edge portions of said diaphragm,
      ii. actuator means for axially displacing in a direction oblique to said reflective surface a central portion of said diaphragm relative to said peripheral edge portions thereof, said actuator means not penetrating said diaphragm and adapted to exert adjustable axially directed forces on said diaphragm, said axially directed forces exerted by said actuator means being confined to a central portion of said diaphragm and including a tension component, said actuator means including a flexible puller plate fastened to the rear surface of said diaphragm, said flexible puller plate having radially differential flexibility, the outer radial portions thereof being more flexible than the inner radial portions thereof.

6. The mirror of claim 5 wherein said flexible puller plate is further defined as having an outer radial portion of less thickness than the central radial portion thereof.

7. The mirror of claim 5 wherein said flexible puller plate is further defined as having a circular plan view.

8. The mirror of claim 7 wherein said circular puller plate has a radially tapered cross section which is thinner at the outer radial edges thereof.

9. The mirror of claim 8 wherein the taper angle of said puller plate cross section is about 2.5 degrees ±1 degree.

10. The mirror of claim 9 wherein said mirror diaphragm has a circular plan view.

11. The mirror of claim 10 wherein said puller plate is fastened concentrically to the rear surface of said diaphragm.

12. The mirror of claim 10 further including a resilient adhesive member joining said puller plate to said diaphragm.

13. The mirror of claim 10 wherein the ratio of the diameter of said puller plate to said diaphragm is at least one-half.

14. The mirror of claim 5 wherein actuator means is further defined as comprising in combination an elongated threaded member fastened to the center of said puller plate and extending axially rearward therefrom, and a mirror support member held in fixed relationship to said peripheral support means for said diaphragm, said mirror support member being threadably engageable with said elongated threaded member.

* * * * *